United States Patent
Ozawa et al.

(10) Patent No.: US 11,303,314 B2
(45) Date of Patent: Apr. 12, 2022

(54) RECEIVER AND RECEIVER CONTROLLING METHOD

(71) Applicant: SONY SEMICONDUCTOR SOLUTIONS CORPORATION, Kanagawa (JP)

(72) Inventors: Nobuhisa Ozawa, Kanagawa (JP); Naoto Yoshikawa, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 278 days.

(21) Appl. No.: 16/480,554

(22) PCT Filed: Nov. 8, 2017

(86) PCT No.: PCT/JP2017/040182
§ 371 (c)(1),
(2) Date: Jul. 24, 2019

(87) PCT Pub. No.: WO2018/150653
PCT Pub. Date: Aug. 23, 2018

(65) Prior Publication Data
US 2021/0281284 A1    Sep. 9, 2021

(30) Foreign Application Priority Data
Feb. 20, 2017    (JP) .............................. JP2017-028615

(51) Int. Cl.
*H04B 1/26*        (2006.01)
*H04B 1/30*        (2006.01)
*H04B 1/16*        (2006.01)

(52) U.S. Cl.
CPC .............. *H04B 1/30* (2013.01); *H04B 1/163* (2013.01); *H04B 1/1607* (2013.01)

(58) Field of Classification Search
CPC .. H04B 17/309; H04B 17/318; H04B 17/345; H04B 1/28; H04B 10/60; H04B 10/61;
(Continued)

(56) References Cited

U.S. PATENT DOCUMENTS

| 2008/0111525 A1 | 5/2008 | Fukuzawa |
| 2008/0132195 A1 | 6/2008 | Maxim et al. |

(Continued)

FOREIGN PATENT DOCUMENTS

| CN | 102055415 A | 5/2011 |
| JP | 09-275328 A | 10/1997 |

(Continued)

OTHER PUBLICATIONS

International Search Report and Written Opinion of PCT Application No. PCT/JP2017/040182, dated Jan. 30, 2018, 08 pages of ISRWO.

(Continued)

*Primary Examiner* — Nhan T Le
(74) *Attorney, Agent, or Firm* — Chip Law Group (57) ABSTRACT

In a receiver that demodulates a received signal, deterioration of signal quality is suppressed. A current output unit generates and outputs, from a voltage signal, a current signal including a predetermined offset current in a low-frequency component between a high-frequency component having a frequency higher than a predetermined frequency and the low-frequency component having a frequency lower than the predetermined frequency. A demodulation unit demodulates the high-frequency component. A filter circuit passes, in the current signal, the high-frequency component from a current output unit to the demodulation unit, and causes the low-frequency component to flow from the current output unit to a predetermined reference potential point.

12 Claims, 8 Drawing Sheets

(58) Field of Classification Search
CPC ...... H04B 10/697; H04B 1/1027; H04B 1/18; H04B 1/24; H04B 5/02
See application file for complete search history.

(56) References Cited

U.S. PATENT DOCUMENTS

| | | | |
|---|---|---|---|
| 2011/0098013 A1 | 4/2011 | Takahashi et al. | |
| 2012/0021713 A1 | 1/2012 | Mikhemar et al. | |
| 2012/0194265 A1* | 8/2012 | Katsube | H03H 11/1252 327/554 |
| 2017/0077903 A1* | 3/2017 | Koide | H03H 11/1217 |

FOREIGN PATENT DOCUMENTS

| | | |
|---|---|---|
| JP | 2002-232239 A | 8/2002 |
| JP | 2003-018743 A | 1/2003 |
| JP | 2003-152538 A | 5/2003 |
| JP | 2004-517513 A | 6/2004 |
| JP | 2008-124192 A | 5/2008 |
| JP | 2008236135 A | 10/2008 |
| JP | 2011-097160 A | 5/2011 |
| JP | 2012-500597 A | 1/2012 |
| JP | 2012-156936 A | 8/2012 |
| JP | 2015-100023 A | 5/2015 |

OTHER PUBLICATIONS

Office Action for JP Patent Application No. 2018-567987, dated Jul. 27, 2021, 03 pages of English Translation and 03 pages of Office Action.

\* cited by examiner

RECEIVER AND RECEIVER CONTROLLING METHOD

CROSS REFERENCE TO RELATED APPLICATIONS

This application is a U.S. National Phase of International Patent Application No. PCT/JP2017/040182 filed on Nov. 8, 2017, which claims priority benefit of Japanese Patent Application No. JP 2017-028615 filed in the Japan Patent Office on Feb. 20, 2017. Each of the above-referenced applications is hereby incorporated herein by reference in its entirety.

TECHNICAL FIELD

The present technology relates to a receiver and a receiver controlling method. More specifically, the present technology relates to a receiver that mixes a received signal with a local signal and demodulates a mixed signal, and a receiver controlling method.

BACKGROUND ART

Conventionally, radio signal receivers have widely used a direct conversion method of directly converting a frequency of a received signal into a baseband signal without converting the frequency into an intermediate frequency. In this direct conversion method, quadrature demodulation of generating an in-phase (I) signal and a quadrature (Q) signal is performed by a quadrature mixer to reduce an influence of image interference. Then, since the received signal from an antenna is weak, an amplifier for amplifying the received signal is generally disposed in a front stage of the quadrature mixer (see, for example, Patent Document 1).

CITATION LIST

Patent Document

Patent Document 1: Japanese Patent Application Laid-Open No. 2015-100023

SUMMARY OF THE INVENTION

Problems to be Solved by the Invention

In the above-described conventional technology, the amplifier is disposed in the front stage of the quadrature mixer. Therefore, a low-frequency noise such as a flicker noise is generated inside the amplifier in a relatively low frequency band. Furthermore, in the amplifier, an offset current may be generated due to product variations of internal elements or the like in addition to the low-frequency noise. The above-described receiver has a problem of deterioration of signal quality of the received signal due to the low-frequency noise and the offset current.

The present technology has been made in view of the foregoing, and an objective is to suppress the deterioration of the image quality in the receiver that demodulates the received signal.

Solutions to Problems

The present technology has been made to solve the above-described problems, and a first aspect of the present technology is a receiver and a method of controlling the receiver, the receiver including a current output unit configured to generate and output, from a voltage signal, a current signal including a predetermined offset current in a low-frequency component between a high-frequency component having a frequency higher than a predetermined frequency and the low-frequency component having a frequency lower than the predetermined frequency, a demodulation unit configured to demodulate the high-frequency component, and a filter circuit configured to cause, in the current signal, the high-frequency component to pass from the current output unit to the demodulation unit and cause, in the current signal, the low-frequency component to flow from the current output unit to a predetermined reference potential point. This brings an effect that the high-frequency component passes and the low-frequency component flows into the predetermined reference potential point.

Furthermore, in the first aspect, the filter circuit may cause the low-frequency component to flow via an impedance component having a smaller value as the frequency of the current signal is lower. This brings an effect that the low-frequency component flows via the impedance component having a smaller value as the frequency of the current signal is lower.

Furthermore, in the first aspect, the impedance component may include an inductance component and a resistor component connected between a signal line wired from the current output unit to the demodulation unit and the predetermined reference potential point. This brings an effect that a current flows via the inductance component and the resistor component.

Furthermore, in the first aspect, the filter circuit may be an active inductor. This brings an effect that the high-frequency component does not enter the active inductor and a signal current is supplied to a mixer.

Furthermore, in the first aspect, the filter circuit may be a bias circuit including an operational amplifier to which an input terminal and an output terminal are connected. This brings an effect that the high-frequency component does not enter the bias circuit and the signal current is supplied to the mixer.

Furthermore, in the first aspect, the current signal may be a differential signal including a positive side signal and a negative side signal, and the filter circuit may include a positive side filter circuit causing, in the positive side signal, the high-frequency component to pass from the current output unit to the demodulation unit, and a negative side filter circuit causing, in the negative side signal, the high-frequency component to pass from the current output unit to the demodulation unit. This brings an effect that the high-frequency component passes the positive side filter circuit in the positive side current, and the high-frequency component passes the negative side filter circuit in the negative side current.

Furthermore, in the first aspect, the demodulation unit may include a mixing unit configured to mix the high-frequency component with a predetermined local signal and output a mixed signal, and a current voltage conversion unit configured to perform current voltage conversion for the mixed signal and output a voltage signal. This brings an effect that the current voltage conversion is performed for the mixed signal mixed with the local signal.

Furthermore, in the first aspect, the local signal may include an in-phase side local signal and a quadrature-side local signal having a phase different by 90 degrees from the in-phase side local signal, and the mixing unit may include an in-phase side mixer that mixes the high-frequency component with the in-phase side local signal, and outputs an in-phase side mixed signal, and a quadrature side mixer that mixes the high-frequency component with the quadrature side local signal and outputs a quadrature side mixed signal. This brings an effect that the quadrature demodulation is performed.

Furthermore, in the first aspect, the current voltage conversion unit may include an in-phase side current voltage conversion unit that performs current voltage conversion for the in-phase side mixed signal, and a quadrature side current voltage conversion unit that performs current voltage conversion for the quadrature side mixed signal. This brings an effect that the current voltage conversion is performed for the mixed signal for which the quadrature demodulation has been performed.

Furthermore, in the first aspect, the current output unit may include an in-phase side current output unit and a quadrature side current output unit that output the current signal, and the filter circuit may include an in-phase side filter circuit that causes the high-frequency component to pass from the in-phase side current output unit to the in-phase side mixer, and a quadrature side filter circuit that causes the high-frequency component to pass from the quadrature side current output unit to the quadrature side mixer. This brings an effect that the high-frequency component passes the in-phase side filter circuit and the quadrature side filter circuit.

Furthermore, in the first aspect, the current signal may be a differential signal including a positive side signal and a negative side signal, the in-phase side filter circuit may include an in-phase positive side filter circuit that causes, in the positive side signal, the high-frequency component to pass from the current output unit to the demodulation unit, and an in-phase negative side filter circuit that causes, in the negative side signal, the high-frequency component to pass from the current output unit to the demodulation unit, and the quadrature side filter circuit may include a quadrature positive side filter circuit that causes, in the positive side signal, the high-frequency component to pass from the current output unit to the demodulation unit, and a quadrature negative side filter circuit that causes, in the negative side signal, the high-frequency component to pass from the current output unit to the demodulation unit. This brings an effect that the high-frequency component passes in the differential signal on the in-phase side and on the quadrature side.

Effects of the Invention

According to the present technology, an excellent effect of suppressing the deterioration of the signal quality in the receiver that demodulates the received signal can be obtained. Note that the effects described here are not necessarily limited, and any of effects described in the present disclosure may be exerted.

MODE FOR CARRYING OUT THE INVENTION

Hereinafter, modes for implementing the present technology (hereinafter referred to as embodiments) will be described. Description will be given according to the following order.

1. First Embodiment (Example of Reducing Offset Current)
2. Second Embodiment (Example of Providing gm Amplifiers on In-phase Side and Quadrature Side and Reducing Offset Current)

1. First Embodiment

[Configuration Example of Receiver]

Figure 1:
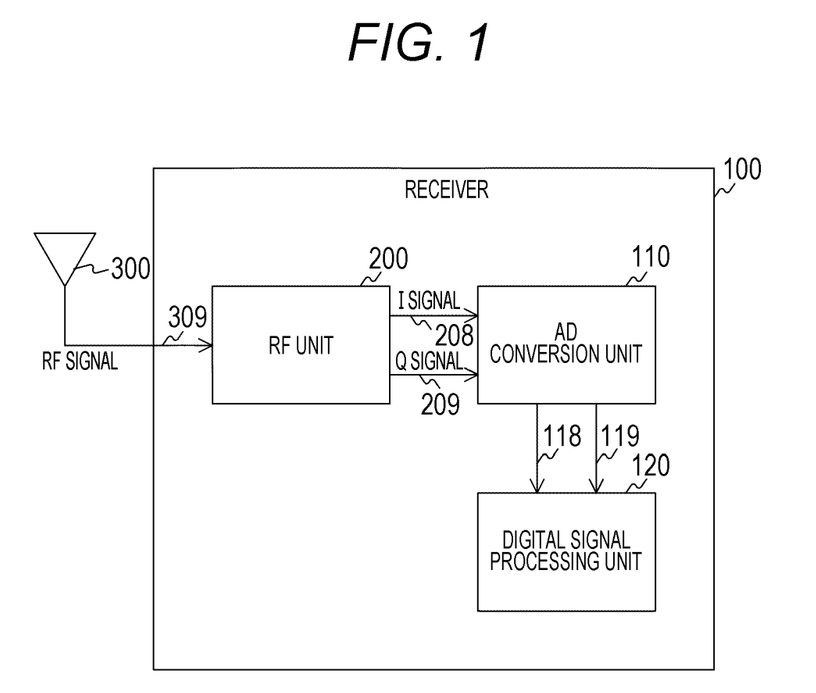
FIG. 1 is a block diagram illustrating a configuration example of a receiver according to a first embodiment of the present technology.

FIG. 1 is a block diagram illustrating a configuration example of a receiver 100 according to a first embodiment of the present technology. The receiver 100 receives a radio frequency (RF) signal and demodulates the RF signal by a direct conversion method, and includes an RF unit 200, an analog to digital (AD) conversion unit 110, and a digital signal processing unit 120. Furthermore, an antenna 300 is attached to the receiver 100.

The antenna 300 converts an electromagnetic wave into an electrical signal and supplies the electrical signal as an RF signal to the RF unit 200 via a signal line 309. The RF signal is a signal that carries a signal wave including an I signal and a Q signal. Furthermore, the RF signal is a differential voltage signal including a positive side signal and a negative side signal.

The RF unit 200 performs IQ demodulation for the RF signal to acquire an analog signal wave (I signal and Q signal). The RF unit 200 supplies the I signal and the Q signal to the AD conversion unit 110 via signal lines 208 and 209.

The AD conversion unit 110 performs AD conversion for the I signal and the Q signal, and supplies a result to the digital signal processing unit 120 via signal lines 118 and 119.

The digital signal processing unit 120 performs predetermined signal processing for the I signal and the Q signal for which the AD conversion has been performed.

[Configuration Example of RF Unit]

Figure 2:
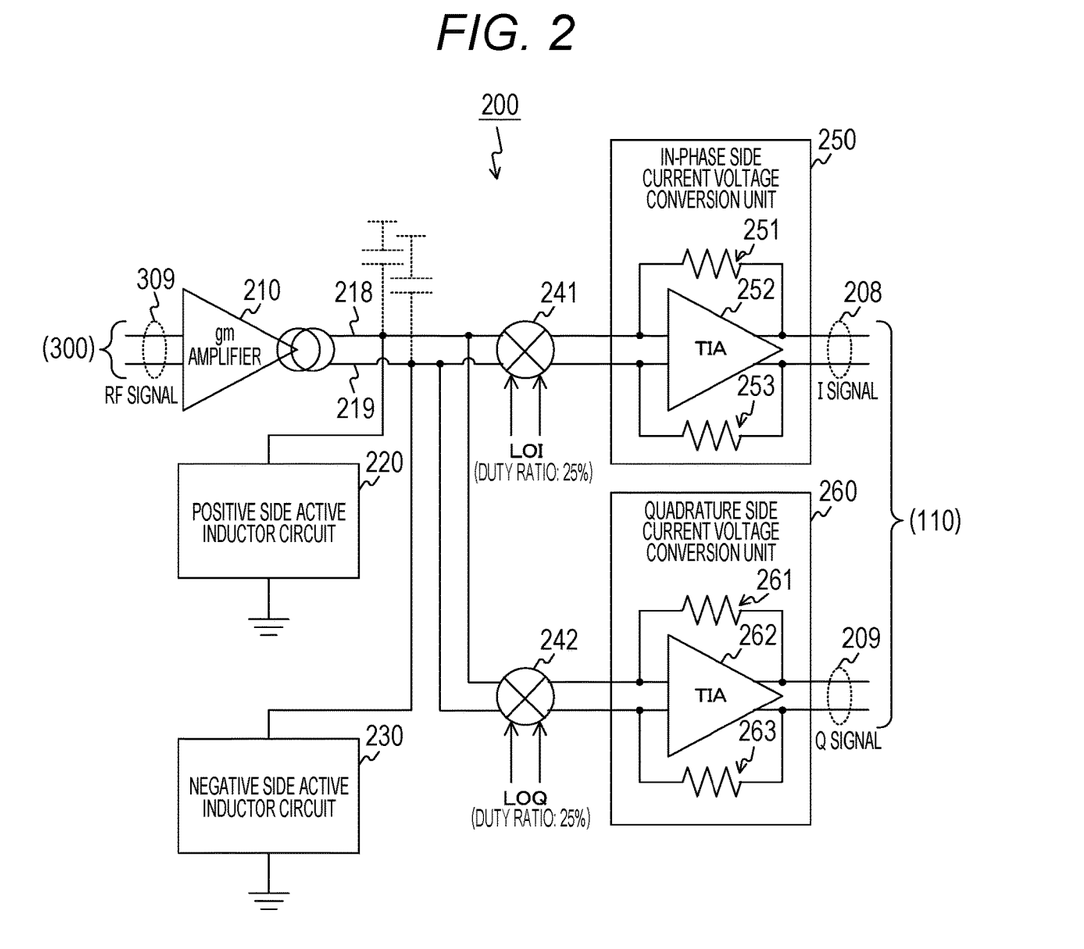
FIG. 2 is a circuit diagram illustrating a configuration example of an RF unit according to the first embodiment of the present technology.

FIG. 2 is a circuit diagram illustrating a configuration example of an RF unit 200 according to the first embodiment of the present technology. The RF unit 200 includes a gm amplifier 210, a positive side active inductor circuit 220, a negative side active inductor circuit 230, an in-phase side mixer 241, a quadrature side mixer 242, an in-phase side current voltage conversion unit 250, and a quadrature side current voltage conversion unit 260.

The gm amplifier 210 converts the RF signal (in other words, the voltage signal) into a differential current signal and amplifies and differentially outputs the differential current signal. A positive side signal in the differential current signal is output via a signal line 218, and a negative side signal in the differential current signal is output via a signal line 219. Here, "gm" of the gm amplifier 210 means transconductance. In the circuit in the gm amplifier 210, a predetermined offset current is generated due to a difference in characteristics between a positive side transistor and a negative side transistor.

Furthermore, in the gm amplifier 210, a flicker noise that is a low-frequency noise having a level that becomes higher as the frequency is lower is generated due to various factors such as variations in elements. Therefore, a low-frequency component lower than a predetermined frequency in the amplified current signal includes the offset current and the flicker noise. Note that the gm amplifier 210 is an example of a current output unit described in the claims.

The positive side active inductor circuit 220 causes a high-frequency component to pass from the gm amplifier 210 to the in-phase side mixer 241 and causes a low-frequency component to flow into a predetermined reference potential point (for example, a ground terminal) in the positive side signal of the current signal from the gm amplifier 210. The high-frequency components include a signal wave.

The negative side active inductor circuit 230 causes the high-frequency component to pass from the gm amplifier 210 to the quadrature side mixer 242 and causes the low-frequency component to flow into the reference potential point in the negative side signal of the current signal from the gm amplifier 210.

The positive side active inductor circuit 220 and the negative side active inductor circuit 230 cause the low-frequency component to flow into the ground terminal, thereby reducing the offset current and the flicker noise in the low-frequency component. Note that a circuit including the positive side active inductor circuit 220 and the negative side active inductor circuit 230 is an example of a filter circuit described in the claims. Furthermore, the positive side active inductor circuit 220 is an example of a positive side filter circuit described in the claims, and the negative side active inductor circuit 230 is an example of a negative side filter circuit described in the claims.

The in-phase side mixer 241 mixes the high-frequency component having passed through the positive side active inductor circuit 220 with a predetermined in-phase side local signal LOI and outputs an in-phase side mixed signal to the in-phase side current voltage conversion unit 250. The quadrature side mixer 242 mixes the high-frequency component having passed through the negative side active inductor circuit 230 with a quadrature side local signal LOQ and outputs a quadrature side mixed signal to the quadrature side current voltage conversion unit 260. Here, duty ratios of the in-phase side local signal LOI and the quadrature side local signal LOQ are set to, for example, 25%. Furthermore, phases of the in-phase side local signal LOI and the quadrature side local signal LOQ are different by 90 degrees from each other. Note that a circuit including the in-phase side mixer 241 and the quadrature side mixer 242 is an example of a mixing unit described in the claims.

The in-phase side current voltage conversion unit 250 performs current voltage conversion for the in-phase side mixed signal and outputs the voltage signal after conversion as the I signal to the AD conversion unit 110. The in-phase side current voltage conversion unit 250 includes resistors 251 and 253 and a trans impedance amplifier (TIA) 252.

The TIA 252 is an amplifier that converts a current to a voltage, and includes a noninverting input terminal, an inverting input terminal, a noninverting output terminal, and an inverting output terminal. The positive side signal of the in-phase side mixed signal is input to the noninverting input terminal of the TIA 252 and the negative side signal of the in-phase side mixed signal is input to the inverting input terminal of the TIA 252. Furthermore, the resistor 251 is inserted between the noninverting input terminal and the noninverting output terminal of the TIA 252, and the resistor 253 is inserted between the inverting input terminal and the inverting output terminal.

The quadrature side current voltage conversion unit 260 performs current voltage conversion for the quadrature side mixed signal and outputs the voltage signal after conversion as the Q signal to the AD conversion unit 110. The quadrature side current voltage conversion unit 260 includes resistors 261 and 263 and a TIA 262.

The TIA 262 is an amplifier similar to the TIA 252. The positive side signal of the quadrature side mixed signal is input to the noninverting input terminal of the TIA 262, and the negative side signal of the quadrature side mixed signal is input to the inverting input terminal of the TIA 262. Furthermore, the resistor 261 is inserted between the noninverting input terminal and the noninverting output terminal of the TIA 262, and the resistor 263 is inserted between the inverting input terminal and the inverting output terminal of the TIA 262.

Note that a circuit including the in-phase side current voltage conversion unit 250 and the quadrature side current voltage conversion unit 260 is an example of a current voltage conversion unit described in the claims.

As described above, the receiver 100 can acquire (in other words, can perform IQ demodulation of) the I signal and the Q signal by the in-phase side mixer 241, the quadrature side mixer 242, the in-phase side current voltage conversion unit 250, and the quadrature side current voltage conversion unit 260. Note that a circuit including the in-phase side mixer 241, the quadrature side mixer 242, the in-phase side current voltage conversion unit 250, and the quadrature side current voltage conversion unit 260 is an example of a demodulation unit described in the claims.

[Configuration Example of Positive Side Active Inductor Circuit]

Figure 3:
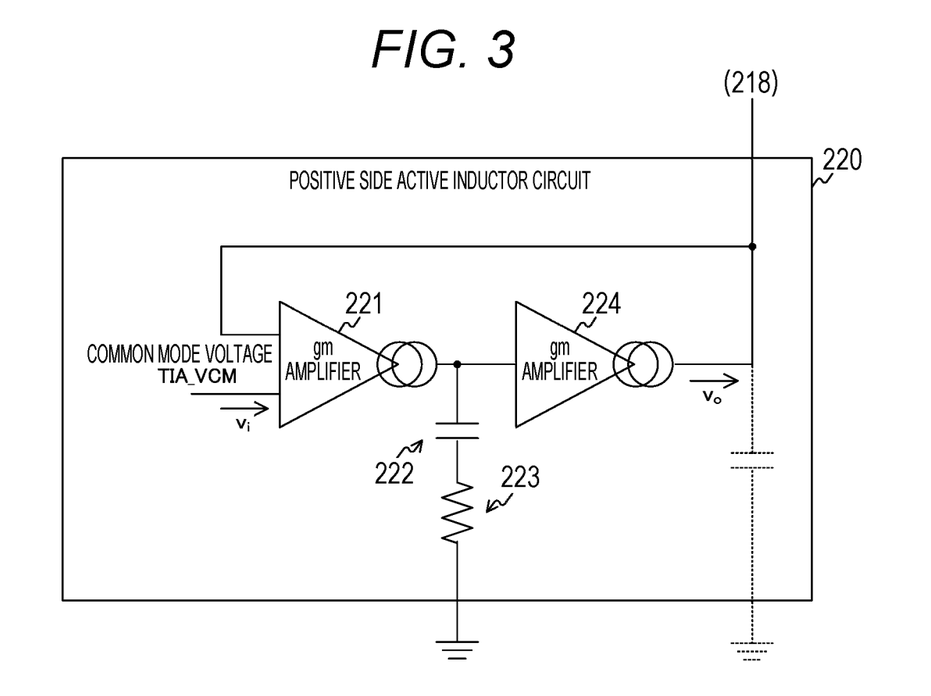
FIG. 3 is a circuit diagram illustrating a configuration example of a positive side active inductor circuit according to the first embodiment of the present technology.

FIG. 3 is a circuit diagram illustrating a configuration example of the positive side active inductor circuit 220 according to the first embodiment of the present technology. The positive side active inductor circuit 220 includes gm amplifiers 221 and 224, a capacitor 222, and a resistor 223.

A noninverting input terminal of the operational amplifier 221 is connected to an output terminal of the gm amplifier 224 and the signal line 218. Furthermore, a common mode voltage TIA_VCM is input to an inverting input terminal of the gm amplifier 221, and an output terminal is connected to the capacitor 222 and an input terminal of the gm amplifier 224. The common mode voltage TIA_VCM is a common mode voltage of the signal lines 218 and 219 for transmitting differential signals.

One end of the capacitor 222 is connected to the output terminal of the gm amplifier 221 and the input terminal of the gm amplifier 224, and the other end is connected to the resistor 223.

One end of the resistor 223 is connected to the capacitor 222, and the other end is connected to the ground terminal.

The input terminal of the gm amplifier 224 is connected to the output terminal of the gm amplifier 221 and the capacitor 222, and the output terminal is connected to the noninverting input terminal of the gm amplifier 221 and the signal line 218.

A current i can be expressed by the following expression, where a current input to the positive side active inductor circuit 220 having the above configuration is i and a voltage of the output terminal of the gm amplifier 224 in the subsequent stage is $v_i$.

$$i = v_i gm_1 \{1/(sC_1) + R_L\} gm_2 \quad \text{Expression 1}$$

In the above expression, $gm_1$ represents a transconductance of the gm amplifier 221 and $gm_2$ represents a transconductance of the gm amplifier 224. The unit of these conductance is, for example, siemens (S). Furthermore, s represents a complex number. $C_1$ represents the capacitance of the capacitor 222, and the unit is, for example, farad (F). $R_L$ represents a resistor value of the resistor 223, and the unit is, for example, ohm. Furthermore, the unit of the current i is, for example, ampere (A), and the unit of the voltage $v_i$ is, for example, volt (V).

The expression 1 can be transformed into the following expression.

$$i/v_i = \{(gm_1 gm_2)/(sC_1)\} + gm_1 gm_2 R_L \quad \text{Expression 2}$$

The first term of the expression 2 indicates a reciprocal of an inductance value of the inductance component, and the second term indicates a reciprocal of the resistor value of the resistor component. In other words, the positive side active inductor circuit 220 can be represented by an equivalent circuit including the inductance component and the resistor component.

Furthermore, the output voltage $v_o$ can be expressed by the following expression in consideration of parasitic capacitance.

$$v_o = (v_i - v_o) gm_1 \{1/(sC_1) + R_L\} gm_2/sC_2 \quad \text{Expression 3}$$

In the above expression, $C_2$ represents a capacitance value of the parasitic capacitance, and the unit is, for example, farad (F). The unit of the output voltage $v_o$ is, for example, volts (V).

The expression 3 can be transformed into the following expression.

[Math 1]

$$v_0 = \frac{\frac{gm_1 gm_2 R_L}{C_2} s + \frac{gm_1 gm_2}{C_1 C_2}}{s^2 + \frac{gm_1 gm_2 R_L}{C_2} s + \frac{gm_1 gm_2}{C_1 C_2}} v_i \quad \text{Expressive 4}$$

Here, q is defined by the following expression.

$$q = (1/R_L) \cdot \{C_2/(gm_1 gm_2 C_1)\}^{1/2} \quad \text{Expression 5}$$

By setting q in the expression 5 to be small, a transfer function from $v_i$ to $v_o$ in the expression 4 can be regarded as a transfer function of a low-pass filter. In other words, in a path from the gm amplifier 210 to the ground terminal, the impedance of the positive side active inductor circuit 220 becomes smaller as the frequency is lower, and the low-frequency component can be caused to flow to the ground terminal. Therefore, the offset current and flicker noise included in the low-frequency component can be absorbed by the positive side active inductor circuit 220.

Note that the configuration of the negative side active inductor circuit 230 is similar to the configuration of the positive side active inductor circuit 220.

Figure 4:
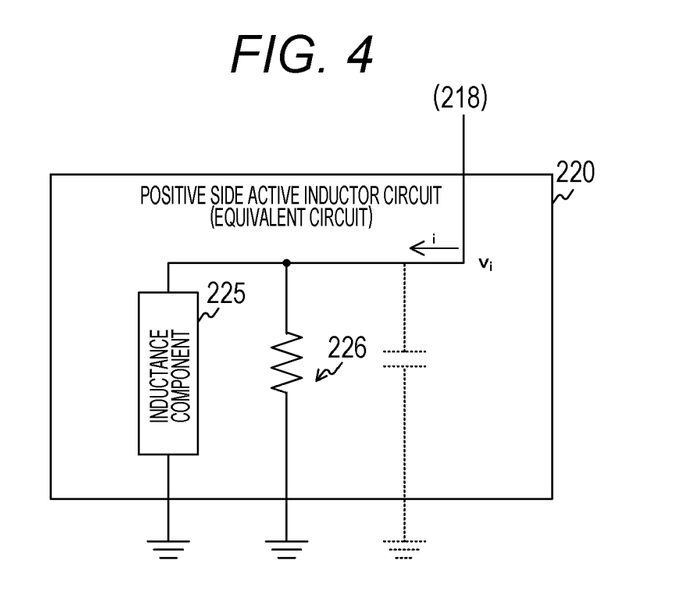
FIG. 4 is an example of an equivalent circuit of the positive side active inductor circuit according to the first embodiment of the present technology.

FIG. 4 is an example of an equivalent circuit of the positive side active inductor circuit 220 according to the first embodiment of the present technology. As illustrated in FIG. 4, the positive side active inductor circuit 220 can be expressed by an equivalent circuit including an inductance component 225 and a resistor component 226 connected in parallel to the signal line 218. In FIG. 4, the dotted capacitance indicates a parasitic capacitance.

From the expression 2, an inductance value $L_E$ of the inductance component 225 is expressed by the following expression.

$$L_E = sC_1/(gm_1 \times gm_2) \quad \text{Expression 6}$$

In the above expression, the unit of the inductance value $L_E$ is, for example, Henry (H).

Furthermore, according to the expression 2, a resistor value $R_E$ of the resistor component 226 is expressed by the following expression.

$$R_E = 1/(gm_1 gm_2 R_L) \quad \text{Expression 7}$$

As described above, the flicker noise and the offset current are generated in the gm amplifier 210 in the previous stage. Similarly, the flicker noise and the offset current are slightly generated in the positive side active inductor circuit 220. However, in general, in the gm amplifier, a gate length of a metal-oxide-semiconductor (MOS) transistor to be used is relatively short for improvement of frequency characteristics. Therefore, the flicker noise and the offset current generated in the gm amplifier 210 are overwhelmingly larger than the flicker noise and the offset current generated in the positive side active inductor circuit 220.

Furthermore, since the frequency of the RF signal and the frequency after frequency conversion by the in-phase side mixer 241 are sufficiently separated, the high-frequency component can be caused to pass to the in-phase side mixer 241 even if the inductance value $L_E$ of the inductance component 225 is made small. Since the inductance value $L_E$ can be made small, $C_1$ can be made small and the value of $gm_1 \times gm_2$ can be made large according to the expression 6. A large value of $gm_1 \times gm_2$ indicates that a loop gain of the entire loop-like positive side active inductor circuit 220 is high. Therefore, the voltage offset generated in the positive side active inductor circuit 220 can be made small.

By the connection of the above-described positive side active inductor circuit 220, the offset current and flicker noise generated by the gm amplifier 210 in the previous stage can be absorbed. Furthermore, in the RF signal, deterioration of distortion characteristics due to an interference wave in a low frequency band can be avoided. Furthermore, since an offset voltage of the positive side active inductor circuit 220 itself is small, as described above, the offset voltage due to a difference in reference voltages between the positive side active inductor circuit 220 and the TIA 252 in the subsequent stage can be suppressed to a minimum. Moreover, to incorporate the function of the receiver 100 into an integrated circuit (IC), a low voltage and a large current are often required. Making the inductance value small is convenient to satisfy the requirement.

Furthermore, the parasitic capacitance exists at a connection point of the positive side active inductor circuit 220 and the in-phase side mixer 241, as illustrated in FIG. 4. A transfer function from a reference voltage of the ground terminal becomes a transfer function of a circuit in which a band pass filter and a low-pass filter are combined, due to the parasitic capacitance and the capacitor 222. The transfer function can be almost regarded as a transfer function of the low-pass filter by setting the value of q in the expression 5 to be small. q can be easily adjusted by, for example, the resistor value $R_L$ of the resistor 223.

Then, the frequency band of the RF signal is out of a high-frequency band when viewed from the low-pass filter of the positive side active inductor circuit 220. For this reason, the noise component generated by the positive side active inductor circuit 220 is attenuated in the frequency band of the RF signal, and becomes small so as not to affect the demodulation of the RF signal.

It is also conceivable to remove the low-frequency component by means of a high pass filter including a capacitor and a resistor. However, in this method, the signal current is divided between the resistor and the mixer in the frequency band of the RF signal, and thus the resistor value of the resistor cannot be made small. For this reason, an offset voltage is generated by the offset current flowing through the resistor in the high-pass filter, and a deviation from a design value of an operating point of the output terminal of the gm amplifier 210 occurs. In particular, in a low voltage system, the deviation of the operating point becomes a problem, which causes deterioration of distortion characteristics. Furthermore, in the high-pass filter, the impedances of the in-phase side current voltage conversion unit 250 and the quadrature side current voltage conversion unit 260 are high, amplitudes of the I signal and the Q signal become large, which incurs the deterioration of distortion characteristics.

Figure 5:
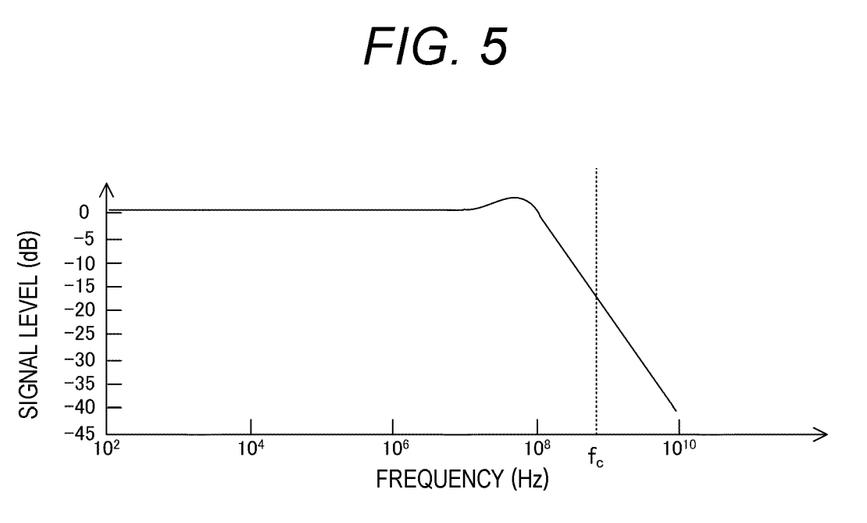
FIG. 5 is a graph illustrating an example of frequency characteristics of the positive side active inductor circuit according to the first embodiment of the present technology.

FIG. 5 is a graph illustrating an example of frequency characteristics of the positive side active inductor circuit 220 according to the first embodiment of the present technology. Consider a case where values shown in the following expression are set for the elements in the positive side active inductor circuit 220.

$C_1 = 0.2$ (pF)

$C_2 = 0.1$ (pF)

$gm_1 = 100$ (μS)

$gm_2 = 50$ (μS)

$R_1 = 2 (k\Omega)$ [Math 2]

The vertical axis in FIG. 5 represents a signal level of the output voltage $v_o$ of the positive side active inductor circuit 220 for which the values in the above expression are set, and the horizontal axis represents the frequency of the current signal. The signal level in a low-frequency band lower than a certain frequency fc is relatively high, and the signal level in a low-frequency band higher than the frequency fc is low. In other words, the positive side active inductor circuit 220 functions as a low-pass filter in the path from the gm amplifier 210 to the ground terminal.

[Operation Example of Receiver]

Figure 6:
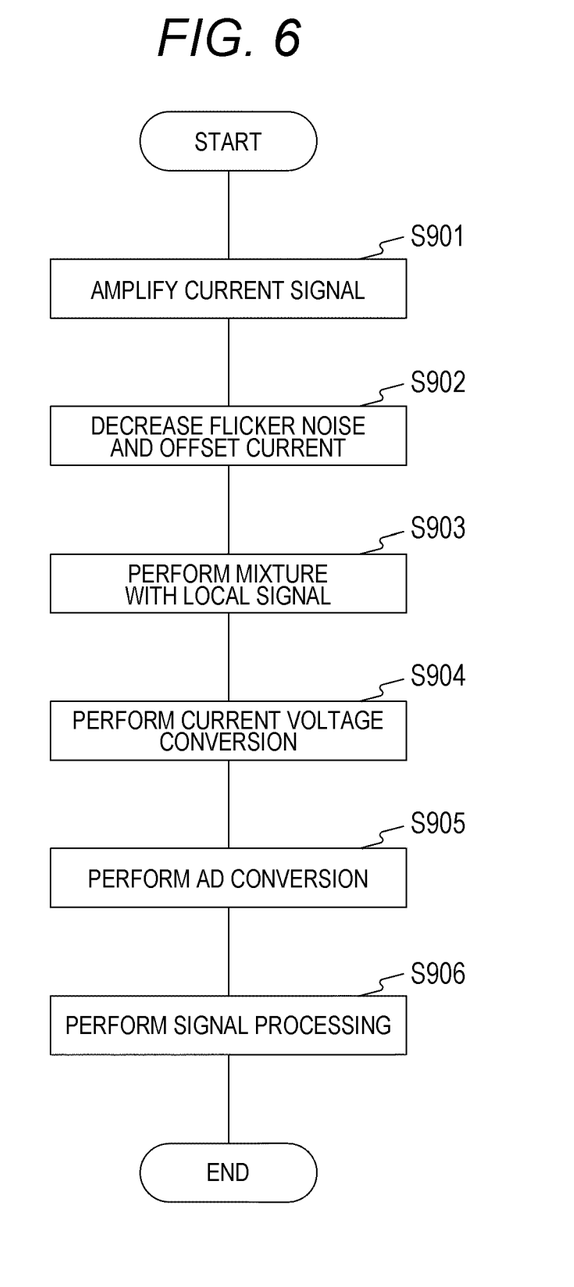
FIG. 6 is a flowchart illustrating an example of an operation of the receiver according to the first embodiment of the present technology.

FIG. 6 is a flowchart illustrating an example of an operation of the receiver 100 according to the first embodiment of the present technology. This operation is started when, for example, the receiver 100 is powered on.

The gm amplifier 210 of the receiver 100 converts the voltage signal into the current signal and amplifies the current signal (step S901). The positive side active inductor circuit 220 and the negative side active inductor circuit 230 decrease the flicker noise and the offset current by the impedance that is smaller as the frequency is lower (step S902).

Then, the in-phase side mixer 241 and the quadrature side mixer 242 mix the high-frequency component having passed through the positive side active inductor circuit 220 and the negative side active inductor circuit 230 with the local signal (step S903). The in-phase side current voltage conversion unit 250 and the quadrature side current voltage conversion unit 260 perform the current voltage conversion for the mixed signal to take out the I signal and the Q signal (step S904).

The AD conversion unit 110 performs the AD conversion of converting the I signal and the Q signal into the digital signals (step S905), and the digital signal processing unit 120 executes various types of signal processing for the digital signals (step S906). After step S906, the receiver 100 terminates the reception operation.

As described above, according to the first embodiment of the present technology, the positive side active inductor circuit 220 causes the high-frequency component of the positive side signal to pass and causes the low-frequency component to flow into the ground terminal, thereby reducing the offset current included in the low-frequency component. Furthermore, since the low-frequency component includes the flicker noise, the receiver 100 can also reduce the flicker noise. Similarly for the negative side signal, the negative side active inductor circuit 230 can reduce the offset current and the flicker noise by the negative side active inductor circuit 230. Thereby, the deterioration of the signal quality due to the offset current and the flicker noise can be suppressed.

[Modification]

In the above-described first embodiment, the offset current has been reduced by the active inductor circuit. However, the offset current can be reduced by a circuit other than the active inductor circuit as long as the circuit can be expressed by the equivalent circuit in FIG. 4. A receiver 100 of a modification of the first embodiment is different from the first embodiment in reducing an offset current by a simpler circuit than the active inductor circuit.

Figure 7:
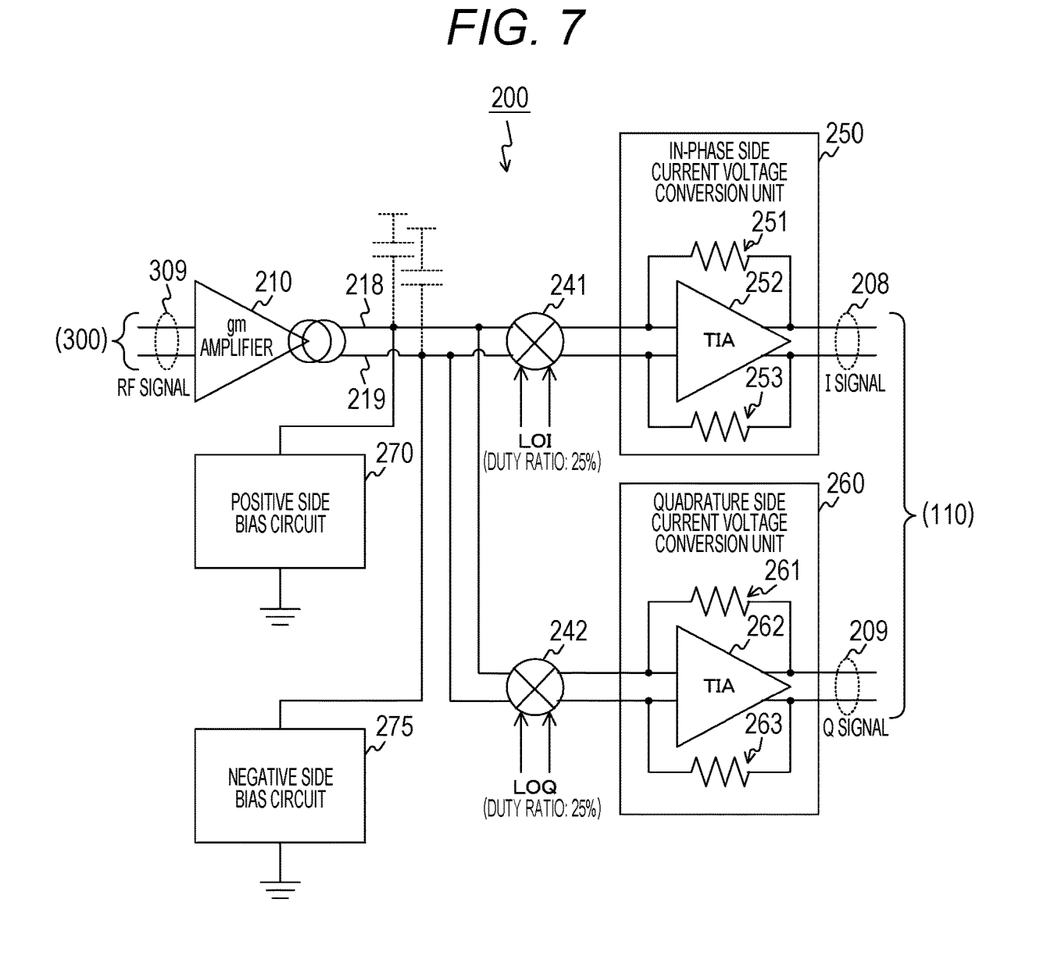
FIG. 7 is a circuit diagram illustrating a configuration example of an RF unit according to a modification of the first embodiment of the present technology.

FIG. 7 is a circuit diagram illustrating a configuration example of an RF unit 200 according to a modification of the first embodiment of the present technology. The RF unit 200 of the modification of the first embodiment is different from the first embodiment in being provided with a positive side bias circuit 270 and a negative side bias circuit 275 instead of the positive side active inductor circuit 220 and the negative side active inductor circuit 230.

Figure 8:
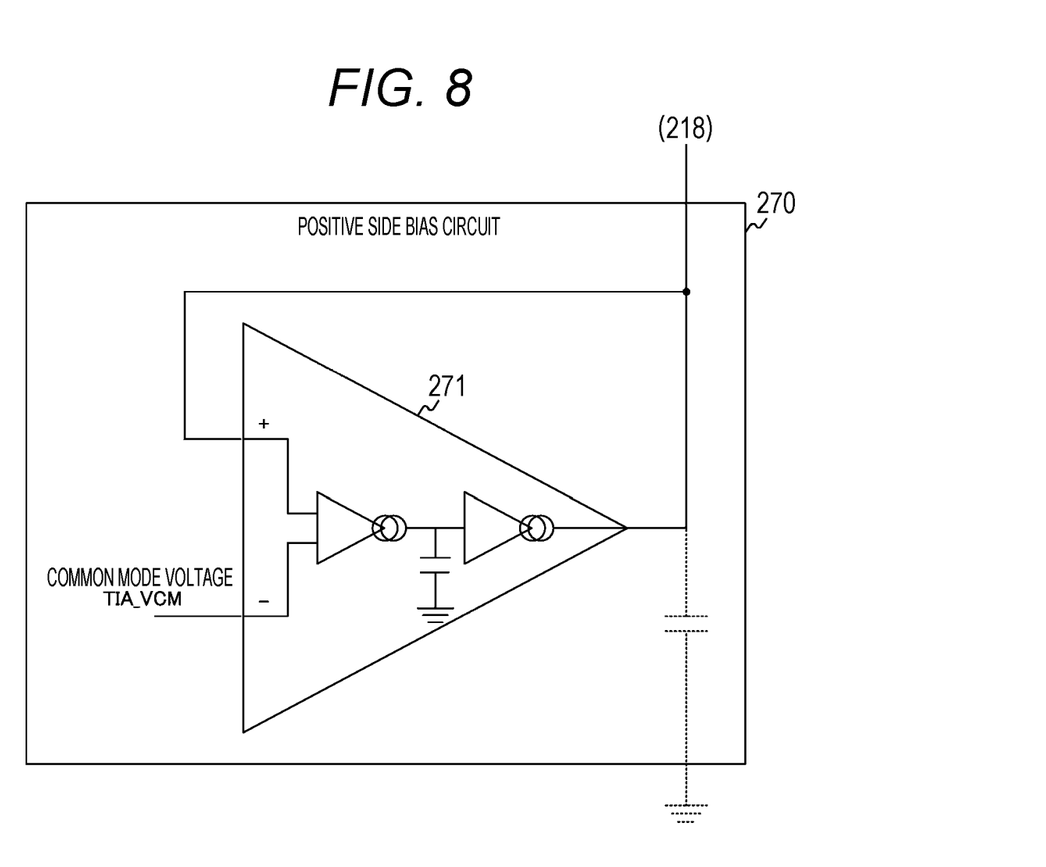
FIG. 8 is a circuit diagram illustrating a configuration example of a positive side bias circuit according to a modification of the first embodiment of the present technology.

FIG. 8 is a circuit diagram illustrating a configuration example of the positive side bias circuit 270 according to the modification of the first embodiment of the present technology. The positive side bias circuit 270 includes an operational amplifier 271.

A common mode voltage TIA_VCM is input to an inverting input terminal of the operational amplifier 271, and an output terminal of the operational amplifier 271 is connected to an input terminal of the operational amplifier 271 and a signal line 218. Note that the configuration of the negative side bias circuit 275 is similar to the configuration of the positive side bias circuit 270.

The bias circuit 270 having the above-described configuration can also be expressed by the equivalent circuit in FIG. 4. Therefore, a low-frequency component can be caused to flow into a ground terminal, and an offset current and a flicker noise can be absorbed.

As described above, according to a modification of the first embodiment of the present technology, the low-frequency component is caused to flow into the ground terminal by the operational amplifier 271. Therefore, the offset current and the flicker noise can be reduced by a simpler configuration than an active inductor.

2. Second Embodiment

In the above-described first embodiment, one gm amplifier 210 has been shared by the in-phase side and the quadrature side, and the current signal from the amplifier has been divided and supplied to both the in-phase side mixer 241 and the quadrature side mixer 242. However, in a case where the duty ratio is made large, for example, the supply current to each of the in-phase side mixer 241 and the quadrature side mixer 242 may be insufficient. In this case, gm amplifiers are only required to be arranged in respective systems on the in-phase side and the quadrature side to amplify the current signal. A receiver 100 according to a second embodiment is different from the first embodiment in that gm amplifiers are disposed on an in-phase side and a quadrature side, respectively.

Figure 9:
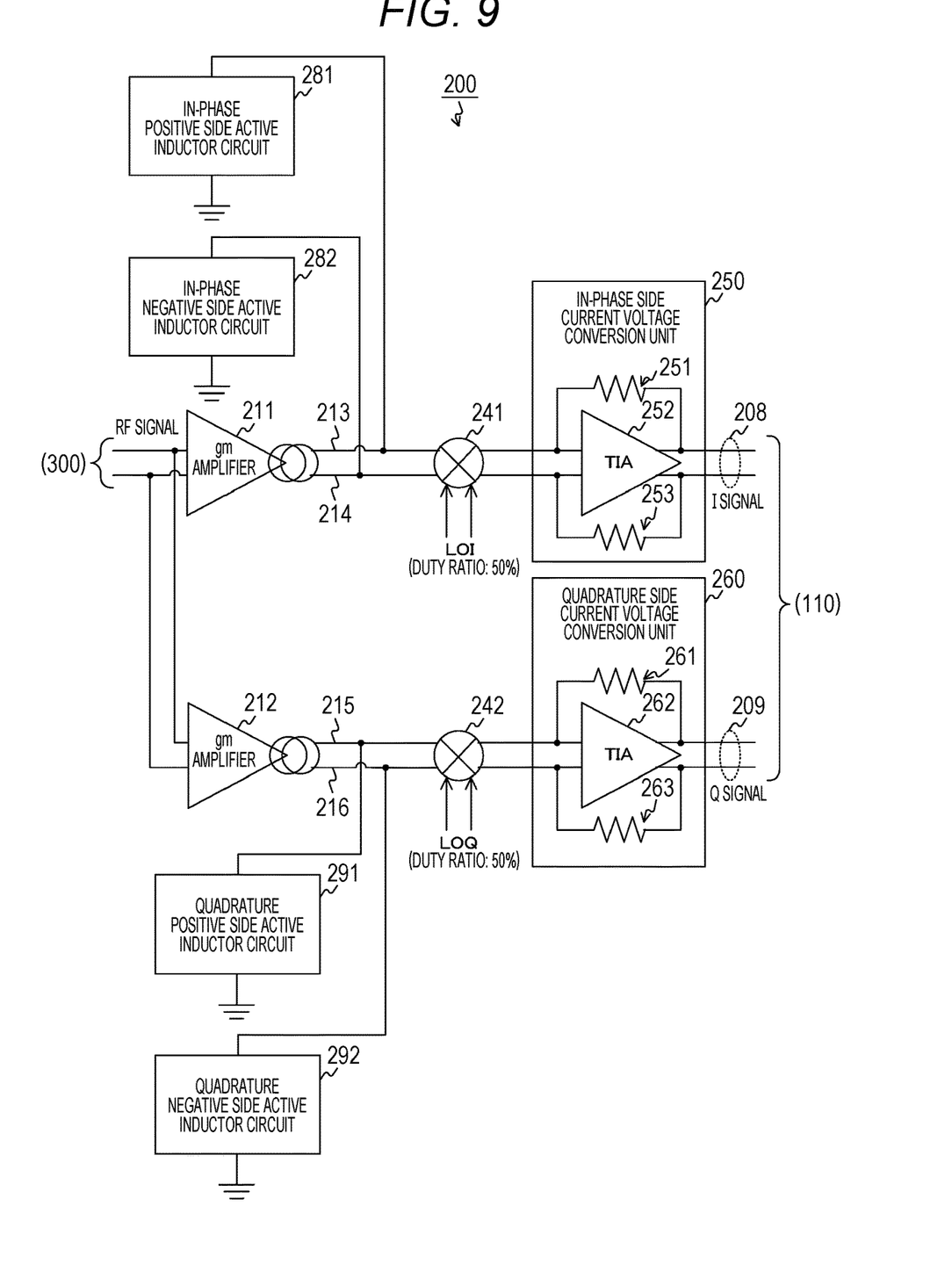
FIG. 9 is a circuit diagram illustrating a configuration example of an RF unit according to the second embodiment of the present technology.

FIG. 9 is a circuit diagram illustrating a configuration example of an RF unit 200 according to the second embodiment of the present technology. The RF unit 200 of the second embodiment is different from the first embodiment in having an in-phase side gm amplifier 211 and a quadrature side gm amplifier 212 disposed instead of the gm amplifier 210. Furthermore, the RF unit 200 of the second embodiment is different from the first embodiment in having an in-phase positive side active inductor circuit 281 and a quadrature positive side active inductor circuit 291 disposed instead of the positive side active inductor circuit 220. Moreover, the RF unit 200 is different from the first embodiment in having an in-phase negative side active inductor circuit 282 and a quadrature negative side active inductor circuit 292 disposed instead of the negative side active inductor circuit 230.

The in-phase side gm amplifier 211 and the quadrature side gm amplifier 212 are commonly connected to an antenna 300, and amplify the current signal. Furthermore, the in-phase side gm amplifier 211 outputs a positive side signal via a signal line 213 and outputs a negative side signal via a signal line 214. The quadrature side gm amplifier 212 outputs a positive side signal via a signal line 215 and outputs a negative side signal via a signal line 216. Note that the in-phase side gm amplifier 211 is an example of an in-phase side current output unit described in the claims, and the quadrature side gm amplifier 212 is an example of a quadrature side current output unit described in the claims.

The in-phase positive side active inductor circuit 281 is connected to the signal line 213 and the in-phase negative side active inductor circuit 282 is connected to the signal line 214. The quadrature positive side active inductor circuit 291 is connected to the signal line 215 and the quadrature negative side active inductor circuit 292 is connected to the signal line 216.

The in-phase side mixer 241 is connected to the signal lines 213 and 214 and the quadrature side mixer 242 is connected to the signal lines 215 and 216.

Furthermore, duty ratios of the in-phase side local signal LOI and the quadrature side local signal LOQ are set to, for example, 50%.

Configurations of the in-phase positive side active inductor circuit 281, the in-phase negative side active inductor circuit 282, the quadrature positive side active inductor circuit 291, and the quadrature negative side active inductor circuit 292 are similar to the configurations of the positive side active inductor circuit 220.

Note that a circuit including the in-phase positive side active inductor circuit 281 and the in-phase negative side active inductor circuit 282 is an example of an in-phase side filter circuit described in the claims. Furthermore, a circuit including the quadrature positive side active inductor circuit 291 and the quadrature negative side active inductor circuit 292 is an example of a quadrature side filter circuit described in the claims. The in-phase positive side active inductor circuit 281 is an example of an in-phase positive side filter circuit described in the claims, and the in-phase negative side active inductor circuit 282 is an example of the in-phase negative side filter circuit described in the claims. The quadrature positive side active inductor circuit 291 is an example of a quadrature positive side filter circuit described in the claims, and the quadrature negative side active inductor circuit 292 is an example of a quadrature negative side filter circuit described in the claims.

Furthermore, the in-phase positive side active inductor circuit 281 can be replaced with a circuit similar to the positive side bias circuit 270 of the modification. The in-phase negative side active inductor circuit 282, the quadrature positive side active inductor circuit 291, and the quadrature negative side active inductor circuit 292 can be similarly replaced.

As described above, according to the second embodiment of the present technology, the current signal is amplified by the in-phase side gm amplifier 211 and the quadrature side gm amplifier 212, and thus the supply current to each of the in-phase side and the quadrature side can be increased, as compared with a case provided with the gm amplifier 210 only. Thereby, current shortage can be eliminated.

Note that the above-described embodiments describe an example for embodying the present technology, and the matters in the embodiments and the matters used to specify the invention in the claims have correspondence, respectively. Similarly, the matters used to specify the invention in the claims and the matters in the embodiment of the present technology given the same names have correspondence, respectively. However, the present technology is not limited to the embodiments, and can be embodied by application of various modifications to the embodiments without departing from the gist of the present technology.

Furthermore, the processing procedures described in the above embodiments may be regarded as a method having these series of procedures, and also regarded as a program for causing a computer to execute these series of procedures and as a recording medium for storing the program. As this recording medium, for example, a compact disc (CD), a mini disc (MD), a digital versatile disc (DVD), a memory card, a Blu-ray (registered trademark) disc, or the like can be used.

Note that the effects described here are not necessarily limited, and any of effects described in the present disclosure may be exerted.

Note that the present technology can also have the following configurations.

(1) A receiver including:

a current output unit configured to generate and output, from a voltage signal, a current signal including a predetermined offset current in a low-frequency component between a high-frequency component having a frequency higher than a predetermined frequency and the low-frequency component having a frequency lower than the predetermined frequency;

a demodulation unit configured to demodulate the high-frequency component; and a filter circuit configured to cause, in the current signal, the high-frequency component to pass from the current output unit to the demodulation unit and cause, in the current signal, the low-frequency component to flow from the current output unit to a predetermined reference potential point.

(2) The receiver according to (1), in which the filter circuit causes the low-frequency component to flow via an impedance component having a smaller value as the frequency of the current signal is lower.

(3) The receiver according to (2), in which the impedance component includes an inductance component and a resistor component connected between a signal line wired from the current output unit to the demodulation unit and the predetermined reference potential point.

(4) The receiver according to (3), in which the filter circuit is an active inductor.

(5) The receiver according to (3), in which the filter circuit is a bias circuit including an operational amplifier to which an input terminal and an output terminal are connected.

(6) The receiver according to any one of (1) to (5), in which the current signal is a differential signal including a positive side signal and a negative side signal, and the filter circuit includes a positive side filter circuit causing, in the positive side signal, the high-frequency component to pass from the current output unit to the demodulation unit, and a negative side filter circuit causing, in the negative side signal, the high-frequency component to pass from the current output unit to the demodulation unit.

(7) The receiver according to any one of (1) to (5), in which the demodulation unit includes a mixing unit configured to mix the high-frequency component with a predetermined local signal and output a mixed signal, and a current voltage conversion unit configured to perform current voltage conversion for the mixed signal and output a voltage signal.

(8) The receiver according to (7), in which the local signal includes an in-phase side local signal and a quadrature-side local signal having a phase different by 90 degrees from the in-phase side local signal, and the mixing unit includes an in-phase side mixer that mixes the high-frequency component with the in-phase side local signal, and outputs an in-phase side mixed signal, and a quadrature side mixer that mixes the high-frequency component with the quadrature side local signal and outputs a quadrature side mixed signal.

(9) The receiver according to (8), in which the current voltage conversion unit includes an in-phase side current voltage conversion unit that performs current voltage conversion for the in-phase side mixed signal, and a quadrature side current voltage conversion unit that performs current voltage conversion for the quadrature side mixed signal.

(10) The receiver according to (8) or (9), in which the current output unit includes an in-phase side current output unit and a quadrature side current output unit that output the current signal, and the filter circuit includes an in-phase side filter circuit that causes the high-frequency component to pass from the in-phase side current output unit to the in-phase side mixer, and a quadrature side filter circuit that causes the high-frequency component to pass from the quadrature side current output unit to the quadrature side mixer.

(11) The receiver according to (10), in which the current signal is a differential signal including a positive side signal and a negative side signal, the in-phase side filter circuit includes an in-phase positive side filter circuit that causes, in the positive side signal, the high-frequency component to pass from the current output unit to the demodulation unit, and an in-phase negative side filter circuit that causes, in the negative side signal, the high-frequency component to pass from the current output unit to the demodulation unit, and the quadrature side filter circuit includes a quadrature positive side filter circuit that causes, in the positive side signal, the high-frequency component to pass from the current output unit to the demodulation unit, and a quadrature negative side filter circuit that causes, in the negative side signal, the high-frequency component to pass from the current output unit to the demodulation unit.

(12) A receiver controlling method including:

a current output process of generating and outputting, from a voltage signal, a current signal including a predetermined offset current in a low-frequency component between a high-frequency component having a frequency higher than a predetermined frequency and the low-frequency component having a frequency lower than the predetermined frequency;

a demodulation process of demodulating the high-frequency component; and a filtering process of causing the high-frequency component in the current signal to pass from the current output unit to the demodulation unit and causing the low-frequency component in the current signal to flow from the current output unit to a predetermined reference potential point.

REFERENCE SIGNS LIST

100 Receiver
110 AD conversion unit
120 Digital signal processing unit
200 RF unit
210, 221, 224 gm amplifier
211 In-phase side gm amplifier
212 Quadrature side gm amplifier
220 Positive side active inductor circuit
222 Capacitor
223, 251, 253, 261, 263 Resistor
225 Inductance component
226 Resistor component
230 Negative side active inductor circuit
241 In-phase side mixer
242 Quadrature side mixer
250 In-phase side current voltage conversion unit
252, 262 TIA
260 Quadrature side current voltage conversion unit
270 Positive side bias circuit
271 Operational amplifier
275 Negative side bias circuit 281 In-phase positive side active inductor circuit
282 In-phase negative side active inductor circuit
291 Quadrature positive side active inductor circuit
292 Quadrature negative side active inductor circuit
300 Antenna

The invention claimed is:

1. A receiver, comprising:
 a current output unit configured to generate and output, from a first voltage signal, a current signal including an offset current in a low-frequency component between a high-frequency component having a frequency higher than a determined frequency and the low-frequency component having a frequency lower than the determined frequency;
 a demodulation unit configured to demodulate the high-frequency component; and
 a filter circuit configured to:
  cause the high-frequency component in the current signal to pass from the current output unit to the demodulation unit; and
  cause the low-frequency component in the current signal to flow from the current output unit to a reference potential point via an impedance component, wherein the impedance component has an impedance value that becomes smaller as a frequency of the current signal becomes lower.

2. The receiver according to claim 1, wherein the impedance component includes an inductance component and a resistor component connected between a signal line wired from the current output unit to the demodulation unit and the reference potential point.

3. The receiver according to claim 1, wherein the filter circuit is an active inductor.

4. The receiver according to claim 1, wherein the filter circuit is a bias circuit including an operational amplifier to which an input terminal and an output terminal are connected.

5. The receiver according to claim 1, wherein
 the current signal is a differential signal including a positive side signal and a negative side signal, and
 the filter circuit includes:
  a positive side filter circuit configured to cause the high-frequency component in the positive side signal to pass from the current output unit to the demodulation unit; and
  a negative side filter circuit configured to cause the high-frequency component in the negative side signal to pass from the current output unit to the demodulation unit.

6. The receiver according to claim 1, wherein the demodulation unit includes:
 a mixing unit configured to:
  mix the high-frequency component with a local signal; and
  output a mixed signal; and
 a current voltage conversion unit configured to:
  perform current voltage conversion for the mixed signal; and
  output a second voltage signal.

7. The receiver according to claim 6, wherein
 the local signal includes an in-phase side local signal and a quadrature side local signal having a phase different by 90 degrees from the in-phase side local signal, and
 the mixing unit includes:
  an in-phase side mixer configured to:
   mix the high-frequency component with the in-phase side local signal; and
   output an in-phase side mixed signal; and
  a quadrature side mixer configured to:
   mix the high-frequency component with the quadrature side local signal; and
   output a quadrature side mixed signal.

8. The receiver according to claim 7, wherein the current voltage conversion unit includes:
 an in-phase side current voltage conversion unit configured to perform current voltage conversion for the in-phase side mixed signal; and
 a quadrature side current voltage conversion unit configured to perform current voltage conversion for the quadrature side mixed signal.

9. The receiver according to claim 7, wherein
 the current output unit includes:
  an in-phase side current output unit; and
  a quadrature side current output unit configured to output the current signal, and
 the filter circuit includes:
  an in-phase side filter circuit configured to cause the high-frequency component to pass from the in-phase side current output unit to the in-phase side mixer; and
  a quadrature side filter circuit configured to cause the high-frequency component to pass from the quadrature side current output unit to the quadrature side mixer.

10. The receiver according to claim 9, wherein
 the current signal is a differential signal including a positive side signal and a negative side signal,
 the in-phase side filter circuit includes:
  an in-phase positive side filter circuit configured to cause the high-frequency component in the positive side signal to pass from the current output unit to the demodulation unit; and
  an in-phase negative side filter circuit configured to cause the high-frequency component in the negative side signal to pass from the current output unit to the demodulation unit, and
 the quadrature side filter circuit includes:
  a quadrature positive side filter circuit configured to cause the high-frequency component in the positive side signal to pass from the current output unit to the demodulation unit; and
  a quadrature negative side filter circuit configured to cause the high-frequency component in the negative side signal to pass from the current output unit to the demodulation unit.

11. A receiver controlling method, comprising:
 generating and outputting, from a voltage signal, a current signal including an offset current in a low-frequency component between a high-frequency component having a frequency higher than a determined frequency and the low-frequency component having a frequency lower than the determined frequency;
 demodulating the high-frequency component;
 causing the high-frequency component in the current signal to pass from a current output unit to a demodulation unit; and
 causing the low-frequency component in the current signal to flow from the current output unit to a reference potential point via an impedance component, wherein the impedance component has an impedance value that becomes smaller as a frequency of the current signal becomes lower.

12. A receiver, comprising:

a current output unit configured to generate and output, from a first voltage signal, a current signal including an offset current in a low-frequency component between a high-frequency component having a frequency higher than a determined frequency and the low-frequency component having a frequency lower than the determined frequency, wherein the current signal is a differential signal including a positive side signal and a negative side signal;

a demodulation unit configured to demodulate the high-frequency component; and a filter circuit configured to:
  cause the high-frequency component in the current signal to pass from the current output unit to the demodulation unit; and
  cause the low-frequency component in the current signal to flow from the current output unit to a reference potential point, wherein the filter circuit includes:
  a positive side filter circuit configured to cause the high-frequency component in the positive side signal to pass from the current output unit to the demodulation unit; and
  a negative side filter circuit configured to cause the high-frequency component in the negative side signal to pass from the current output unit to the demodulation unit.

\* \* \* \* \*